(12) United States Patent
Shim et al.

(10) Patent No.: US 11,888,192 B2
(45) Date of Patent: Jan. 30, 2024

(54) FUEL CELL SYSTEM AND APPARATUS AND METHOD FOR DIAGNOSING SAME

(71) Applicants: HYUNDAI MOTOR COMPANY, Seoul (KR); KIA CORPORATION, Seoul (KR)

(72) Inventors: Jae Young Shim, Yongin-si (KR); Hyo Jin Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 265 days.

(21) Appl. No.: 17/375,648

(22) Filed: Jul. 14, 2021

(65) Prior Publication Data

US 2022/0173416 A1 Jun. 2, 2022

(30) Foreign Application Priority Data

Nov. 27, 2020 (KR) ......................... 10-2020-0162343

(51) Int. Cl.
*H01M 8/04537* (2016.01)
*H01M 8/0432* (2016.01)
*B60L 58/40* (2019.01)

(52) U.S. Cl.
CPC ......... *H01M 8/04619* (2013.01); *B60L 58/40* (2019.02); *H01M 8/0432* (2013.01); *H01M 8/04559* (2013.01); *H01M 8/04589* (2013.01); *H01M 2250/20* (2013.01)

(58) Field of Classification Search
CPC ........... H01M 8/0432; H01M 8/04559; H01M 8/04589; H01M 8/0494; H01M 8/0491; B60L 58/40
See application file for complete search history.

(56) References Cited

U.S. PATENT DOCUMENTS

2008/0220299 A1* 9/2008 Saito ................. H01M 8/04089
429/432

FOREIGN PATENT DOCUMENTS

KR 10-0776317 B1 11/2007

* cited by examiner

*Primary Examiner* — Brittany L Raymond
(74) *Attorney, Agent, or Firm* — MCDONNELL BOEHNEN HULBERT & BERGHOFF LLP

(57) ABSTRACT

A fuel cell system includes a fuel cell stack made by stacking a plurality of cells and configured to generate power by being supplied with fuel gas and oxidation gas, a high-voltage battery configured to supplement the power generated by the fuel cell stack while being charged with the power generated by the fuel cell stack or being discharged, a converter provided between the fuel cell stack and the high-voltage battery and configured to change an output voltage or an output current of the fuel cell stack, a power control unit configured to control the fuel cell stack to generate power when the fuel cell stack is requested to be diagnosed, the power control unit being configured to adjust the output current of the fuel cell stack to a predetermined current, and a voltage sensing unit configured to sense a voltage of the fuel cell stack or voltages of the plurality of cells included in the fuel cell stack in the state in which the output current of the fuel cell stack is the predetermined current.

16 Claims, 4 Drawing Sheets

FUEL CELL SYSTEM AND APPARATUS AND METHOD FOR DIAGNOSING SAME

CROSS REFERENCE TO RELATED APPLICATIONS

The present application claims priority of Korean Patent Application No. 10-2020-0162343 filed on Nov. 27, 2020, the entire contents of which is incorporated herein for all purposes by this reference.

BACKGROUND

Field of the Disclosure

The present disclosure relates to a fuel cell system installed in a fuel cell vehicle, and to an apparatus and a method for diagnosing a degree of degradation of a fuel cell stack included in the fuel cell system.

Description of the Related Art

A fuel cell refers to a cell, that is, a kind of power generation device that directly converts chemical energy, which is generated by oxidation of fuel, into electrical energy. The fuel cell is basically similar to a chemical cell in that the fuel cell uses oxidation and reduction reactions. However, the fuel cell is different from the chemical cell in that reactants are continuously supplied from the outside and reaction products are continuously removed to the outside of the system, unlike the chemical cell which performs a cell reaction in a closed system. Recently, a fuel cell power generation system has been commercialized, and research has been actively conducted to use the fuel cell as an environmentally-friendly energy source for a vehicle because the reaction product of the fuel cell is pure water.

The fuel cell system includes a fuel cell stack which generates electrical energy through a chemical reaction, an air supply device which supplies air to an air electrode of the fuel cell stack, and a fuel supply device which supplies hydrogen to a hydrogen electrode of the fuel cell stack. That is, air containing oxygen is supplied to the air electrode (cathode) of the fuel cell stack, and hydrogen is supplied to the hydrogen electrode (anode) of the fuel cell stack.

A proton exchange membrane/polymer electrolyte membrane fuel cell (PEMFC) generates electricity through a chemical reaction between oxygen and hydrogen and additionally generates heat and water. A chemical reaction formula of the PEMFC is as follows.

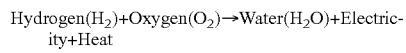

Hydrogen($H_2$)+Oxygen($O_2$)→Water($H_2O$)+Electricity+Heat

There occurs mechanical and chemical degradation of a fuel cell stack of the PEMFC depending on initial quality and operating time. The degradation of the fuel cell stack is accelerated by degradation of an electrolyte membrane and degradation of a catalyst layer which are dominant factors that causes the degradation of the fuel cell stack. In particular, the mechanical degradation of the electrolyte membrane occurs when the state of the electrolyte membrane is physically degraded due to a pin-hole formed in the electrolyte membrane. Further, the chemical degradation in the electrolyte membrane occurs when the electrolyte membrane is structurally changed due to the generation of $OH^-$ radical. The degradation of the electrolyte membrane affects performance of the fuel cell.

In addition, the mechanical degradation of the catalyst layer of the fuel cell occurs when components of the catalyst layer are quantitatively burnt out by water produced by an electrochemical reaction in the fuel cell, and the chemical degradation of the catalyst layer occurs due to a lack of hydrogen. The degradation of the fuel cell stack and the unit cell is accelerated by the complex degradation of the electrolyte membrane and the catalyst layer.

The related art may diagnose only the mechanical degradation of the electrolyte membrane included in the fuel cell stack, but may not diagnose the chemical degradation of the catalyst layer. For this reason, there is only a method of replacing the fuel cell stack when the fuel cell stack is degraded, which causes a problem with costs and time.

The above-mentioned matters described as the background art are provided merely to aid understanding of the background of the present disclosure, and should not be construed to admit that the matters correspond to the technologies already known to those skilled in the art.

SUMMARY

Accordingly, the present disclosure has been made keeping in mind the above problems occurring in the related art, and the present disclosure is intended to provide a technology for complexly diagnosing performance of an electrolyte membrane and a catalyst layer included in a fuel cell stack.

According to one aspect, there is provided a fuel cell system including a fuel cell stack made by stacking a plurality of cells and configured to generate power by being supplied with fuel gas and oxidation gas, a high-voltage battery configured to supplement the power generated by the fuel cell stack while being charged with the power generated by the fuel cell stack or being discharged, a converter provided between the fuel cell stack and the high-voltage battery and configured to change an output voltage or an output current of the fuel cell stack, a power control unit configured to control the fuel cell stack to generate power when the fuel cell stack is requested to be diagnosed, the power control unit being configured to adjust the output current of the fuel cell stack to a predetermined current, and a voltage sensing unit configured to sense a voltage of the fuel cell stack or voltages of the plurality of cells included in the fuel cell stack in the state in which the output current of the fuel cell stack is the predetermined current.

The power control unit may control the converter so that the fuel cell stack outputs the predetermined current, and charge the high-voltage battery with the power generated by the fuel cell stack.

The fuel cell system may further include a battery control unit configured to monitor a state of charge of the high-voltage battery when the fuel cell stack is requested to be diagnosed, and a power consumption device electrically connected to the fuel cell stack or the high-voltage battery and configured to consume inputted power, in which the battery control unit allows the power consumption device to consume the power of the high-voltage battery when the monitored state of charge of the high-voltage battery exceeds a predetermined state of charge.

The fuel cell system may further include a temperature adjustment unit configured to estimate a temperature of the fuel cell stack and raise or lower the estimated temperature of the fuel cell stack when the fuel cell stack is requested to be diagnosed.

The fuel cell system may further include a diagnosis unit configured to diagnose a degraded state of the fuel cell stack based on the voltage of the fuel cell stack or the voltages of the plurality of cells sensed by the voltage sensing unit.

According to another aspect, there is provided an apparatus for diagnosing a fuel cell system, and the apparatus may be connected to the power control unit or the voltage sensing unit of the fuel cell system in a wired or wireless manner and may diagnose the degraded state of the fuel cell stack based on the voltage of the fuel cell stack or the voltages of the plurality of cells.

The apparatus may control the output current of the fuel cell stack to a maximum output current maximally outputted in a predetermined state.

The apparatus may control the output current of the fuel cell stack to a plurality of predetermined output currents and may gradually reduce the output current of the fuel cell stack while keeping the output voltage of the fuel cell stack equal to or lower than a predetermined limit voltage.

The apparatus may calculate a cell voltage ratio, which is a ratio between a minimum cell voltage and an average cell voltage, based on the voltages of the plurality of cells, included in the fuel cell stack, which are sensed in the state in which the output current of the fuel cell stack is the predetermined current, and the apparatus may diagnose the degraded state of the fuel cell stack based on the calculated cell voltage ratio.

The apparatus may monitor a state of charge of the high-voltage battery when diagnosing the fuel cell stack and may consume power of the high-voltage battery when the monitored state of charge of the high-voltage battery exceeds a predetermined state of charge.

The apparatus may estimate a temperature of the fuel cell stack when diagnosing the fuel cell stack, may control the estimated temperature of the fuel cell stack to a predetermined temperature, and may diagnose the degraded state at the predetermined temperature.

According to still another aspect, there is provided a method of diagnosing a fuel cell system, the method including controlling a fuel cell stack to generate power when the fuel cell stack is requested to be diagnosed, controlling an output current of the fuel cell stack to a predetermined current, sensing a voltage of the fuel cell stack or voltages of a plurality of cells included in the fuel cell stack in the state in which the output current of the fuel cell stack is the predetermined current, and diagnosing a degraded state of the fuel cell stack based on the voltage of the fuel cell stack or the voltages of the plurality of cells.

The method may further include monitoring a state of charge of a high-voltage battery before the controlling of the fuel cell stack to generate power; and consuming, by a power consumption device, power of the high-voltage battery when the monitored state of charge of the high-voltage battery exceeds a predetermined state of charge.

The method may further include estimating a temperature of the fuel cell stack before the controlling of the fuel cell stack to generate power, and controlling the estimated temperature of the fuel cell stack to a predetermined temperature.

The controlling of the output current of the fuel cell stack to the predetermined current may include controlling the output current of the fuel cell stack to a plurality of predetermined output currents and gradually reducing the output current of the fuel cell stack while keeping an output voltage of the fuel cell stack equal to or lower than a predetermined limit voltage.

The sensing of the voltages of the plurality of cells may include sensing the voltages of the plurality of cells included in the fuel cell stack in the state in which the output current of the fuel cell stack is the predetermined current, and the diagnosing of the degraded state of the fuel cell stack may include calculating a cell voltage ratio which is a ratio between a minimum cell voltage and an average cell voltage and diagnosing the degraded state of the fuel cell stack based on the calculated cell voltage ratio.

According to the fuel cell system, and the diagnosis apparatus, and method therefor according to the present disclosure, there is an effect of complexly diagnosing performance of the electrolyte membrane and the catalyst layer included in the fuel cell stack.

In addition, the fuel cell stack is diagnosed under a condition in which the output current and the temperature of the fuel cell stack are constant, and as a result, there is an effect of improving diagnosis accuracy.

Therefore, the degraded state of the fuel cell stack is accurately diagnosed, and as a result, there is an effect of maintaining or replacing the degraded fuel cell stack.

DETAILED DESCRIPTION

Figure 1:
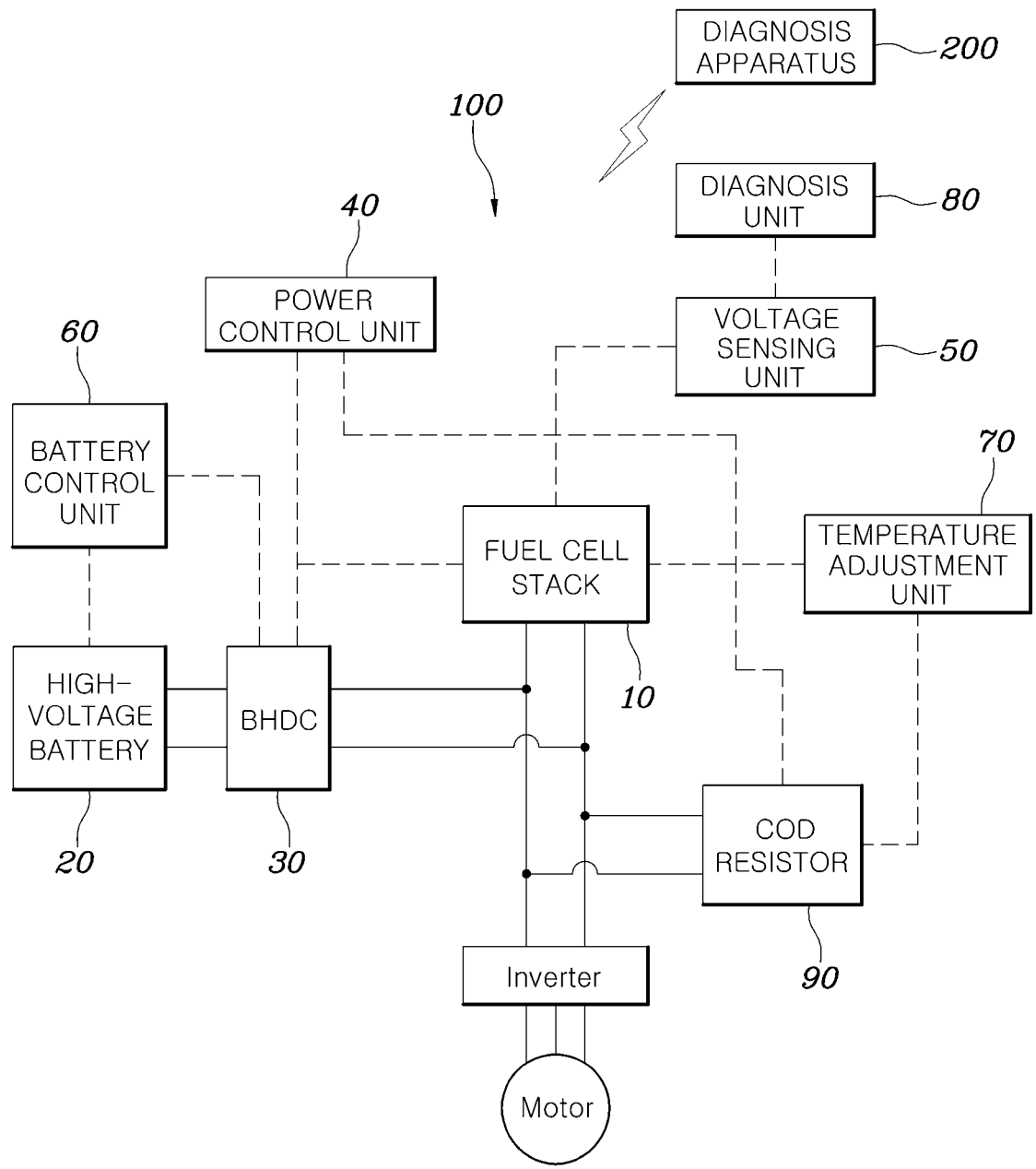
FIG. 1 is a configuration view illustrating a fuel cell system and a diagnosis apparatus for the fuel cell system according to an exemplary embodiment of the present disclosure.

Specific structural or functional descriptions of exemplary embodiments of the present disclosure disclosed in this specification or application are exemplified only for the purpose of explaining the exemplary embodiments according to the present disclosure, the exemplary embodiments according to the present disclosure may be carried out in various forms, and it should not be interpreted that the present disclosure is limited to the exemplary embodiments described in this specification or application.

Because the exemplary embodiments according to the present disclosure may be variously changed and may have various forms, specific exemplary embodiments will be illustrated in the drawings and described in detail in the present specification or application. However, the descriptions of the specific exemplary embodiments are not intended to limit exemplary embodiments according to the concept of the present disclosure to the specific exemplary embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to the another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific exemplary embodiment and do not intend to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, an exemplary embodiment of the present disclosure will be described in detail with reference to the accompanying drawings. Like reference numerals indicated in the respective drawings refer to like members.

FIG. 1 is a configuration view illustrating a fuel cell system 100 and a diagnosis apparatus 200 for the fuel cell system 100 according to an exemplary embodiment of the present disclosure.

Referring to FIG. 1, the fuel cell system 100 according to the exemplary embodiment of the present disclosure includes a fuel cell stack 10 made by stacking a plurality of cells and configured to generate power by being supplied with fuel gas and oxidation gas, a high-voltage battery 20 configured to supplement the power generated by the fuel cell stack 10 while being charged with the power generated by the fuel cell stack 10 or being discharged, a converter 30 provided between the fuel cell stack 10 and the high-voltage battery 20 and configured to change an output voltage or an output current of the fuel cell stack 10, a power control unit 40 configured to control the fuel cell stack 10 to generate power when the fuel cell stack 10 is requested to be diagnosed, the power control unit 40 being configured to control the output current of the fuel cell stack 10 to a predetermined current, and a voltage sensing unit 50 configured to sense a voltage of the fuel cell stack 10 or voltages of the plurality of cells included in the fuel cell stack 10 in the state in which the output current of the fuel cell stack 10 is the predetermined current.

The power control unit 40, the voltage sensing unit 50, a battery control unit 60, a temperature adjustment unit 70, and a diagnosis unit 80 according to the exemplary embodiment of the present disclosure may be implemented by a non-volatile memory (not illustrated) configured to store algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Specifically, the power control unit 40, the voltage sensing unit 50, the battery control unit 60, the temperature adjustment unit 70, and the diagnosis unit 80 according to the exemplary embodiment of the present disclosure may be included in a fuel cell controller (FCU), and the FCU may diagnose performance of the fuel cell while communicating with the diagnosis apparatus 200 for the fuel cell system 100 which will be described below.

The fuel cell stack 10 may be made by stacking the plurality of cells. In particular, the plurality of cells may be electrically connected in series to increase the output voltage. The fuel cell stack 10 may generate power by being supplied with fuel gas and oxidation gas and may be supplied with hydrogen gas and oxygen gas.

The fuel cell system 100 may include only one fuel cell stack 10 or a plurality of fuel cell stacks 10. According to the present disclosure, it is possible to individually diagnose degraded states of the respective fuel cell stacks 10.

The high-voltage battery 20 may be electrically connected to the fuel cell stack 10 and may store the power by being charged with the current generated by the fuel cell stack 10. In addition, the high-voltage battery 20 may supply power to a drive device and auxiliary machinery (BOP) connected to the fuel cell stack 10, while being discharged. In particular, the high-voltage battery 20 may supplement the power generated by the fuel cell stack 10 when the power outputted from the fuel cell stack 10 is lower than required power.

The converter 30 may be provided between the fuel cell stack 10 and the high-voltage battery 20 and may be a bidirectional high-voltage DC/DC converter 30 (BHDC) that supplies power bidirectionally. The BHDC 30 may change the output voltage or the output current of the fuel cell by changing a voltage of the fuel cell stack 10 side or a voltage of the high-voltage battery 20 side.

The power control unit 40 may control the fuel cell stack 10 to generate power and control the output current of the fuel cell stack 10. In particular, the power control unit 40 may control the output current or the power generation of the fuel cell stack 10 by controlling the supply of the fuel gas or the oxidation gas to the fuel cell stack 10.

In particular, when the fuel cell stack 10 is requested to be diagnosed, the power control unit 40 may control the output current of the fuel cell stack 10 to the predetermined current.

The voltage sensing unit 50 may sense the output voltage of the fuel cell stack 10 or sense cell voltages which are voltages of the plurality of cells included in the fuel cell stack 10.

In particular, when the fuel cell stack 10 is requested to be diagnosed, the voltage sensing unit 50 may sense the voltage of the fuel cell stack 10 or the cell voltages in the state in which the output current of the fuel cell stack 10 is the predetermined current.

More specifically, the power control unit 40 may control the converter 30 so that the fuel cell stack 10 outputs the predetermined current, and the power control unit 40 may charge the high-voltage battery 20 with the power generated by the fuel cell stack 10.

In particular, when the fuel cell stack 10 is requested to be diagnosed, the power control unit 40 may control the fuel cell stack 10 to generate power and output the predetermined current. The diagnosis of the fuel cell stack 10 may be requested when the diagnosis apparatus 200 to be described below is connected or in real time.

The power control unit 40 may allow the fuel cell stack 10 to generate power in order to sense the voltage of the fuel cell stack 10 or the cell voltages and may charge the high-voltage battery 20 with the power generated by the fuel cell stack 10.

The fuel cell system 100 may further include the battery control unit 60 configured to monitor a state of charge of the high-voltage battery 20 when the fuel cell stack 10 is requested to be diagnosed, and a power consumption device electrically connected to the fuel cell stack 10 or the high-voltage battery 20 and configured to consume inputted power. The battery control unit 60 may allow the power consumption device to consume the power of the high-voltage battery 20 when the monitored state of charge of the high-voltage battery 20 exceeds a predetermined state of charge.

The battery control unit 60 may monitor, in real time, the state of charge (SOC) of the high-voltage battery 20.

As an example, the power consumption device may be a COD resistor 90 immersed in a coolant for cooling the fuel cell stack 10. As another example, the power consumption device may be an air compressor for supplying air to the fuel cell stack 10, a cooling pump for circulating the coolant, or a cooling fan provided in a radiator for cooling the coolant.

When the monitored state of charge of the high-voltage battery 20 is the predetermined state of charge (A) or less, the power control unit 40 may control the fuel cell stack 10 to generate power.

In addition, when the monitored state of charge of the high-voltage battery 20 exceeds the predetermined state of charge (A), the battery control unit 60 may allow the power consumption device to consume the power of the high-voltage battery 20. As the power consumption device consumes the power of the high-voltage battery 20, the power control unit 40 may allow the fuel cell stack 10 to generate power when the state of charge of the high-voltage battery 20 is the predetermined state of charge (A) or less.

The fuel cell system 100 may further include the temperature adjustment unit 70 configured to estimate a temperature of the fuel cell stack 10 and raise or lower the estimated temperature of the fuel cell stack 10 when the fuel cell stack 10 is requested to be diagnosed.

The temperature adjustment unit 70 may raise or lower the temperature of the fuel cell stack 10.

As an exemplary embodiment, the temperature adjustment unit 70 may adjust a temperature of the fuel cell by controlling a cooling system for cooling the fuel cell stack 10.

The cooling system for cooling the fuel cell stack 10 may include a coolant line extending through the fuel cell stack 10 and configured to allow the coolant to flow thereinto. The coolant line may be connected to the radiator. The cooling system may further include a bypass line that bypasses the radiator through an adjustment valve. In addition, the cooling system may further include a cooling pump that operates to allow the coolant to flow into the coolant line or the bypass line. The temperature adjustment unit 70 may adjust the amount of cooling the fuel cell stack 10 by adjusting a flow rate of the coolant bypassing the radiator through the adjustment valve or adjusting a rotational speed of the cooling pump.

As another exemplary embodiment, the temperature adjustment unit 70 may adjust the amount of heat generated by the fuel cell stack 10 by allowing the fuel cell stack 10 to generate power, adjusting efficiency in generating power, or applying power to the COD resistor 90 immersed in the coolant line.

The fuel cell system 100 may further include the diagnosis unit 80 configured to diagnose a degraded state of the fuel cell stack 10 based on the voltage of the fuel cell stack 10 or the voltages of the plurality of cells sensed by the voltage sensing unit 50.

As described below, the diagnosis apparatus 200, which communicates with the fuel cell system 100, may diagnose the degraded state of the fuel cell stack 10 included in the fuel cell system 100, or the diagnosis unit 80 included in the fuel cell system 100 may directly diagnose the degraded state of the fuel cell stack 10.

The diagnosis apparatus 200 may be an apparatus for diagnosing the fuel cell system 100. The diagnosis apparatus 200 may be connected to the power control unit 40 or the voltage sensing unit 50 of the fuel cell system 100 in a wired or wireless manner and may diagnose the degraded state of the fuel cell stack 10 based on the voltage of the fuel cell stack 10 or the voltages of the plurality of cells.

The diagnosis apparatus 200 for the fuel cell system 100 may be connected to the fuel cell system 100 in a wired or wireless manner, and particularly, connected to the power control unit 40, the voltage sensing unit 50, the battery control unit 60, and the temperature adjustment unit 70 of the fuel cell system 100. The diagnosis apparatus 200 for the fuel cell system 100 according to the exemplary embodiment of the present disclosure may be implemented by a non-volatile memory (not illustrated) configured to algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Figure 2:
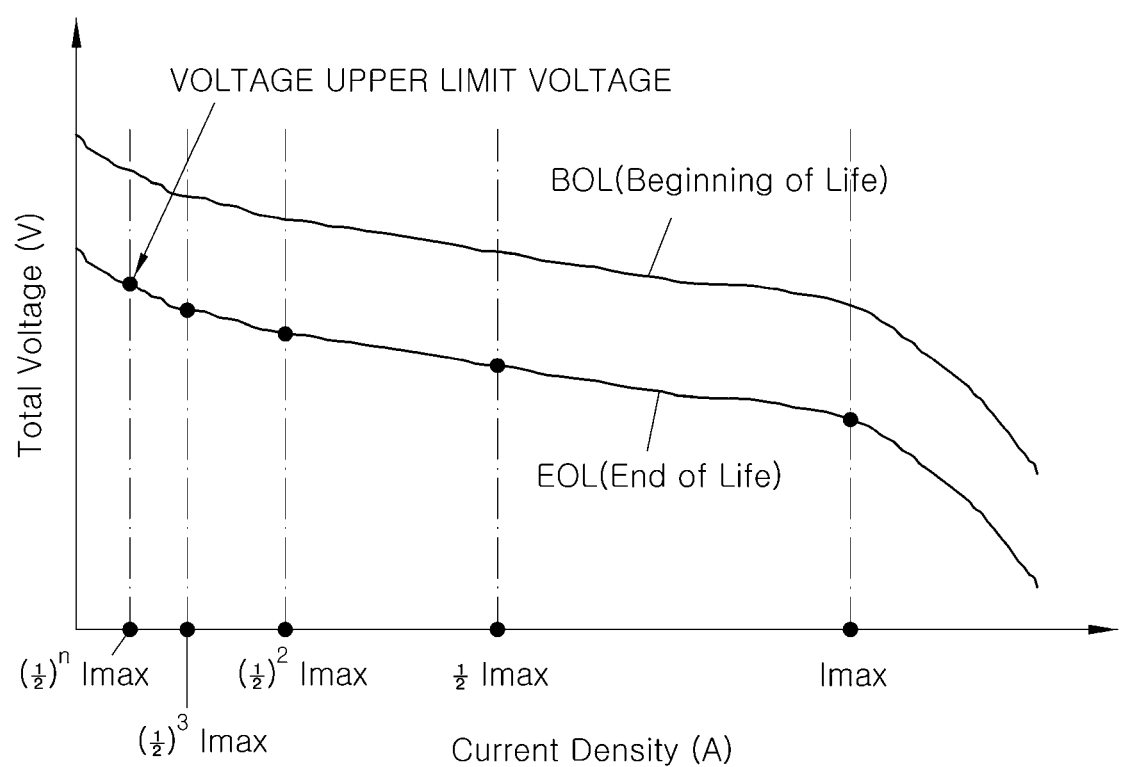
FIG. 2 is a graph illustrating a relationship between output voltages and output currents of a fuel cell according to the exemplary embodiment of the present disclosure.

FIG. 2 is a graph illustrating a relationship between output voltages and output currents of a fuel cell according to the exemplary embodiment of the present disclosure.

Referring further to FIG. 2, the output current of the fuel cell may be inversely proportional to the output voltage, and power generation performance may deteriorate at the end of life (EOL) compared to the beginning of life (BOL). Specifically, when the output current is constant, the output voltage may be relatively lower than at the EOL than at the BOL.

Therefore, the diagnosis apparatus 200 for the fuel cell system 100 according to the exemplary embodiment of the present disclosure may determine the degraded state of the fuel cell stack 10 based on output performance of the fuel cell stack 10.

As an exemplary embodiment, the diagnosis apparatus 200 for the fuel cell system 100 may control the output current of the fuel cell stack 10 to a maximum output current (Imax) that may be maximally outputted in a predetermined state.

More specifically, the predetermined state may be a state in which a predetermined minimum voltage or higher is outputted at the EOL of the fuel cell stack 10. That is, the diagnosis apparatus 200 for the fuel cell system 100 may control the fuel cell stack 10 with the maximum current that may be maximally outputted in the state in which the power control unit 40 outputs the predetermined minimum voltage or higher at the EOL of the fuel cell stack 10.

In this case, the predetermined minimum voltage may be a minimum voltage at which the drive device or the like connected to the fuel cell stack 10 may operate.

In addition, the diagnosis apparatus 200 for the fuel cell system 100 may control the output current of the fuel cell stack 10 to a plurality of predetermined output currents and keep the output voltage of the fuel cell stack 10 equal to or lower than a predetermined limit voltage, thereby gradually reducing the output current of the fuel cell stack 10.

As an exemplary embodiment, the plurality of predetermined output currents may be predetermined as the maximum output current (Imax), ½ of the maximum output current (Imax), (½)^2 of the maximum output current (Imax), and (½)^n of the maximum output current (Imax).

That is, the predetermined output current for controlling the output current of the fuel cell stack 10 may be predetermined as (½)^n of the maximum output current (Imax).

In particular, n according to (½)^n of the maximum output current (Imax) may be gradually increased in the order of 0, 1, 2, 3, and 4 so that the output current of the fuel cell stack 10 is gradually decreased.

As the output current of the fuel cell stack 10 is gradually decreased, the output voltage of the fuel cell stack 10 may be gradually increased. The output current of the fuel cell stack 10 may be decreased until a point in time at which the output voltage of the fuel cell stack 10 reaches the predetermined limit voltage, and as a result, the output voltage of the fuel cell stack 10 may be kept equal to or lower than the predetermined limit voltage.

The predetermined limit voltage may be predetermined as a voltage corresponding to high electric potential at which the plurality of cells included in the fuel cell stack 10 are degraded.

In addition, the diagnosis apparatus 200 for the fuel cell system 100 may calculate a cell voltage ratio, which is a ratio between a minimum cell voltage and an average cell voltage, based on the voltages of the plurality of cells included in the fuel cell stack 10 which are sensed in the state in which the output current of the fuel cell stack 10 is the predetermined current, and the diagnosis apparatus 200 may diagnose the degraded state of the fuel cell stack 10 based on the calculated cell voltage ratio.

The cell voltage ratio ($V_{ratio}$) may be a ratio between the minimum cell voltage and the average cell voltage and may be calculated by the minimum cell voltage/the average cell voltage. The cell voltage ratio ($V_{ratio}$) may vary depending on the output current of the fuel cell and may be mapped to a map in accordance with the output current of the fuel cell.

Figure 3:
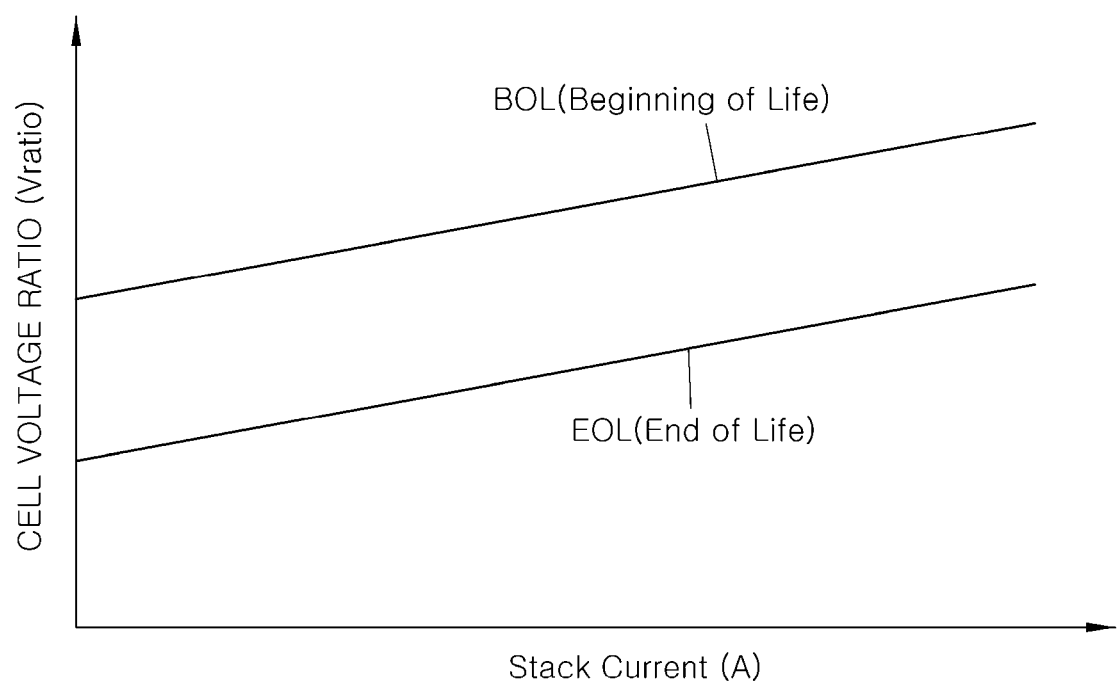
FIG. 3 is a graph illustrating a cell voltage ratio in accordance with the output current of the fuel cell according to the exemplary embodiment of the present disclosure.

FIG. 3 is a graph illustrating the cell voltage ratio in accordance with the output current of the fuel cell according to the exemplary embodiment of the present disclosure.

Referring further to FIG. 3, as the output current of the fuel cell stack 10 is increased, the cell voltage ratio ($V_{ratio}$) may also be increased. In particular, the cell voltage ratio ($V_{ratio}$) tends to be further decreased at the EOL than at the BOL.

The diagnosis apparatus 200 for the fuel cell system 100 senses the cell voltages of the cells included in the fuel cell stack 10 at the plurality of predetermined output currents and calculates the cell voltage ratios ($V_{ratio}$) based on the sensed cell voltages, thereby calculating the cell voltage ratios ($V_{ratio}$) at the plurality of predetermined output currents. The diagnosis apparatus 200 for the fuel cell system 100 may make a map by mapping the cell voltage ratios ($V_{ratio}$) at the plurality of predetermined output currents.

The diagnosis apparatus 200 for the fuel cell system 100 may compare the map of the cell voltage ratios ($V_{ratio}$) at the plurality of predetermined output currents with the prestored map of the cell voltage ratios ($V_{ratio}$) at the BOL or the EOL, thereby diagnosing the degraded state of the fuel cell stack 10.

As another exemplary embodiment, the diagnosis apparatus 200 for the fuel cell system 100 may diagnose the degraded state of the fuel cell stack 10 by using other factors such as the average cell voltage and the minimum cell voltage of the fuel cell stack 10.

The diagnosis apparatus 200 for the fuel cell system 100 may estimate the temperature of the fuel cell stack 10 when diagnosing the fuel cell stack 10, control the estimated temperature of the fuel cell stack 10 to a predetermined temperature, and diagnose the degraded state at the predetermined temperature.

There is a method of directly sensing the temperature of the fuel cell stack 10. However, because the method may not accurately sense an internal temperature of the fuel cell stack 10, the internal temperature of the fuel cell stack 10 may be estimated based on a temperature of the coolant passing through the fuel cell stack 10.

Specifically, the internal temperature of the fuel cell stack 10 may be estimated based on the temperature of the coolant in the coolant line which is discharged after passing through the fuel cell stack 10.

The diagnosis apparatus 200 for the fuel cell system 100 may control the temperature adjustment unit 70 so that the estimated temperature of the fuel cell stack 10 is kept at the predetermined temperature.

Figure 4:
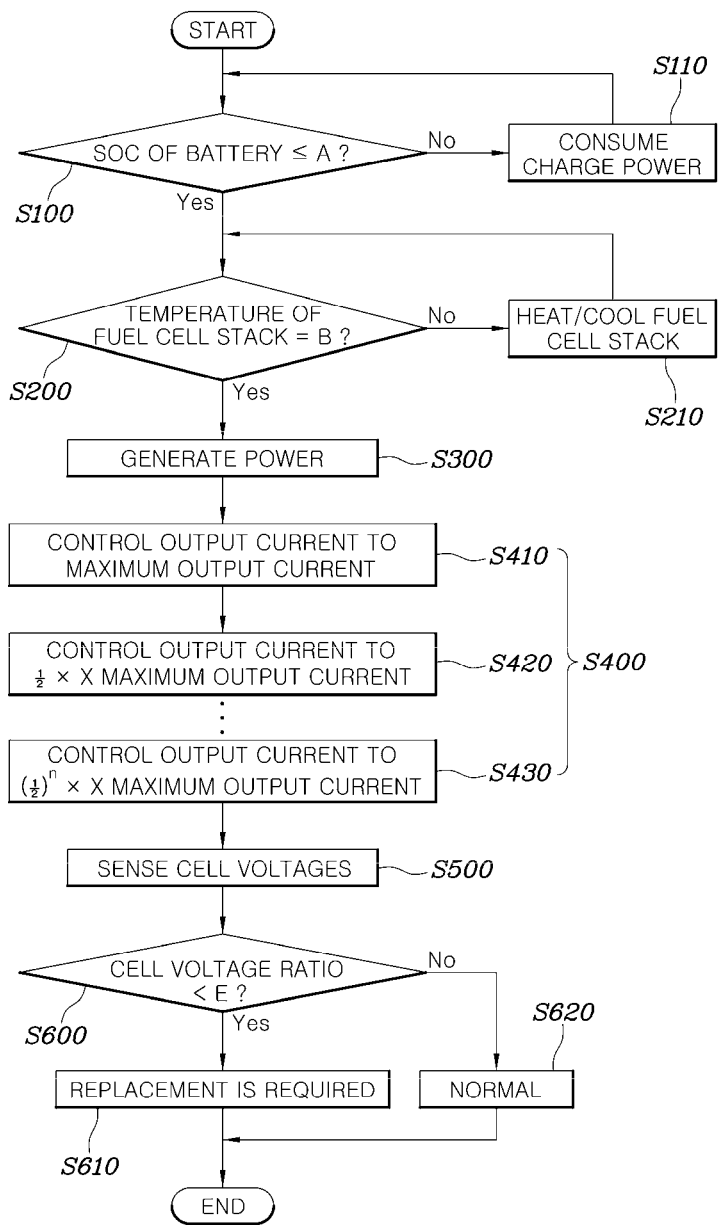
FIG. 4 is a flowchart illustrating a method of diagnosing the fuel cell system according to the exemplary embodiment of the present disclosure.

FIG. 4 is a flowchart illustrating a method of diagnosing the fuel cell system 100 according to the exemplary embodiment of the present disclosure.

Referring further to FIG. 4, a method of diagnosing the fuel cell system 100 according to the exemplary embodiment of the present disclosure includes controlling the fuel cell stack 10 to generate power when the fuel cell stack 10 is requested to be diagnosed at S300, controlling the output current of the fuel cell stack 10 to the predetermined current at S400, sensing the voltage of the fuel cell stack 10 or the voltages of the plurality of cells included in the fuel cell stack 10 in the state in which the output current of the fuel cell stack 10 is the predetermined current at S500, and diagnosing the degraded state of the fuel cell stack 10 based on the voltage of the fuel cell stack 10 or the voltages of the plurality of cells at S600.

The method may further include monitoring a state of charge of the high-voltage battery 20 at S100 before the controlling of the fuel cell stack 10 to generate power at S300, and consuming, by a power consumption device, the power of the high-voltage battery 20 when the monitored state of charge of the high-voltage battery 20 exceeds a predetermined state of charge at S110.

The method may further include estimating a temperature of the fuel cell stack 10 at S200 before the controlling of the fuel cell stack 10 to generate power at S300, and controlling the estimated temperature of the fuel cell stack 10 to a predetermined temperature at S210.

The controlling of the output current of the fuel cell stack 10 to the predetermined current at S400 may include controlling the output current of the fuel cell stack 10 to the plurality of predetermined output currents (S410, S420 and S430), and gradually reducing the output current of the fuel cell stack 10 while keeping the output voltage of the fuel cell stack 10 equal to or lower than a predetermined limit voltage.

The sensing of the voltages of the plurality of cells at S500 may include sensing the voltages of the plurality of cells included in the fuel cell stack 10 in the state in which the output current of the fuel cell stack 10 is the predetermined current. The diagnosing of the degraded state of the fuel cell stack 10 at S600 may include calculating the cell voltage ratio, which is a ratio between the minimum cell voltage and the average cell voltage, and diagnosing the degraded state of the fuel cell stack 10 based on the calculated cell voltage ratio (S610 and S620).

While the specific exemplary embodiments of the present disclosure have been illustrated and described, it will be obvious to those skilled in the art that the present disclosure may be variously modified and changed without departing from the technical spirit of the present disclosure defined in the appended claims.

The invention claimed is:

1. A fuel cell system comprising:
   a fuel cell stack made by stacking a plurality of cells, and the fuel cell stack being configured to generate power by being supplied with fuel gas and oxidation gas;
   a high-voltage battery configured to supplement the power generated by the fuel cell stack while being charged with the power generated by the fuel cell stack or being discharged;
   a converter positioned between the fuel cell stack and the high-voltage battery, the converter being configured to change an output voltage or an output current of the fuel cell stack;
   a power control unit configured to control the fuel cell stack to generate power when the fuel cell stack is requested to be diagnosed, the power control unit being configured to adjust the output current of the fuel cell stack to a predetermined current; and
   a voltage sensing unit configured to sense a voltage of the fuel cell stack or voltages of the plurality of cells included in the fuel cell stack in the state in which the output current of the fuel cell stack is the predetermined current;
   wherein the predetermined current comprises a plurality of currents determined by a maximum output current outputted in an End of Life (EOL) state of the fuel cell stack.

2. The fuel cell system of claim 1, wherein the power control unit controls the converter so that the fuel cell stack outputs the predetermined current, and charges the high-voltage battery with the power generated by the fuel cell stack.

3. The fuel cell system of claim 1, further comprising:
   a battery control unit configured to monitor a state of charge of the high-voltage battery when the fuel cell stack is requested to be diagnosed; and
   a power consumption device electrically connected to the fuel cell stack or the high-voltage battery and configured to consume inputted power,
   wherein the battery control unit allows the power consumption device to consume the power of the high-voltage battery when the monitored state of charge of the high-voltage battery exceeds a predetermined state of charge.

4. The fuel cell system of claim 1, further comprising:
   a temperature adjustment unit configured to estimate a temperature of the fuel cell stack, and to raise or lower the estimated temperature of the fuel cell stack when the fuel cell stack is requested to be diagnosed.

5. The fuel cell system of claim 1, further comprising:
   a diagnosis unit configured to diagnose a degraded state of the fuel cell stack based on the voltage of the fuel cell stack or the voltages of the plurality of cells sensed by the voltage sensing unit.

6. An apparatus for diagnosing the fuel cell system of claim 1, wherein the apparatus is connected to the power control unit or the voltage sensing unit of the fuel cell system in a wired or wireless manner, and diagnoses the degraded state of the fuel cell stack based on the voltage of the fuel cell stack or the voltages of the plurality of cells.

7. The apparatus of claim 6, wherein the apparatus controls the output current of the fuel cell stack to a maximum output current maximally outputted in a predetermined state.

8. The apparatus of claim 6, wherein the apparatus controls the output current of the fuel cell stack to a plurality of predetermined output currents, and gradually reduces the output current of the fuel cell stack while keeping the output voltage of the fuel cell stack equal to or lower than a predetermined limit voltage.

9. The apparatus of claim 6, wherein the apparatus calculates a cell voltage ratio, which is a ratio between a minimum cell voltage and an average cell voltage, based on the voltages of the plurality of cells included in the fuel cell stack, which are sensed in the state in which the output current of the fuel cell stack is the predetermined current; and
   wherein the apparatus diagnoses the degraded state of the fuel cell stack based on the calculated cell voltage ratio.

10. The apparatus of claim 6, wherein the apparatus monitors a state of charge of the high-voltage battery when diagnosing the fuel cell stack and consumes power of the high-voltage battery when the monitored state of charge of the high-voltage battery exceeds a predetermined state of charge.

11. The apparatus of claim 6, wherein the apparatus estimates a temperature of the fuel cell stack when diagnosing the fuel cell stack, controls the estimated temperature of the fuel cell stack to a predetermined temperature, and diagnoses the degraded state at the predetermined temperature.

12. A method of diagnosing a fuel cell system, the method comprising:
   controlling, via a power control unit, a fuel cell stack to generate power when the fuel cell stack is requested to be diagnosed;
   controlling an output current of the fuel cell stack to a predetermined current;
   sensing, via a voltage sensing unit, a voltage of the fuel cell stack or voltages of a plurality of cells included in the fuel cell stack in the state in which the output current of the fuel cell stack is the predetermined current; and
   diagnosing, via a diagnosing unit, a degraded state of the fuel cell stack based on the voltage of the fuel cell stack or the voltages of the plurality of cells;

wherein the predetermined current comprises a plurality of currents determined by a maximum output current outputted in an End of Life (EOL) state of the fuel cell stack.

13. The method of claim 12, further comprising:
monitoring a state of charge of a high-voltage battery before the controlling of the fuel cell stack to generate power; and
consuming, by a power consumption device, power of the high-voltage battery when the monitored state of charge of the high-voltage battery exceeds a predetermined state of charge.

14. The method of claim 12, further comprising:
Estimating, via a temperature adjustment unit, a temperature of the fuel cell stack before the controlling of the fuel cell stack to generate power; and
controlling the estimated temperature of the fuel cell stack to a predetermined temperature.

15. The method of claim 12, wherein the controlling of the output current of the fuel cell stack to the predetermined current includes controlling the output current of the fuel cell stack to a plurality of predetermined output currents and gradually reducing the output current of the fuel cell stack while keeping an output voltage of the fuel cell stack equal to or lower than a predetermined limit voltage.

16. The method of claim 12, wherein the sensing of the voltages of the plurality of cells includes sensing the voltages of the plurality of cells included in the fuel cell stack in the state in which the output current of the fuel cell stack is the predetermined current, and the diagnosing of the degraded state of the fuel cell stack includes calculating a cell voltage ratio which is a ratio between a minimum cell voltage and an average cell voltage and diagnosing the degraded state of the fuel cell stack based on the calculated cell voltage ratio.

* * * * *